UNITED STATES PATENT OFFICE.

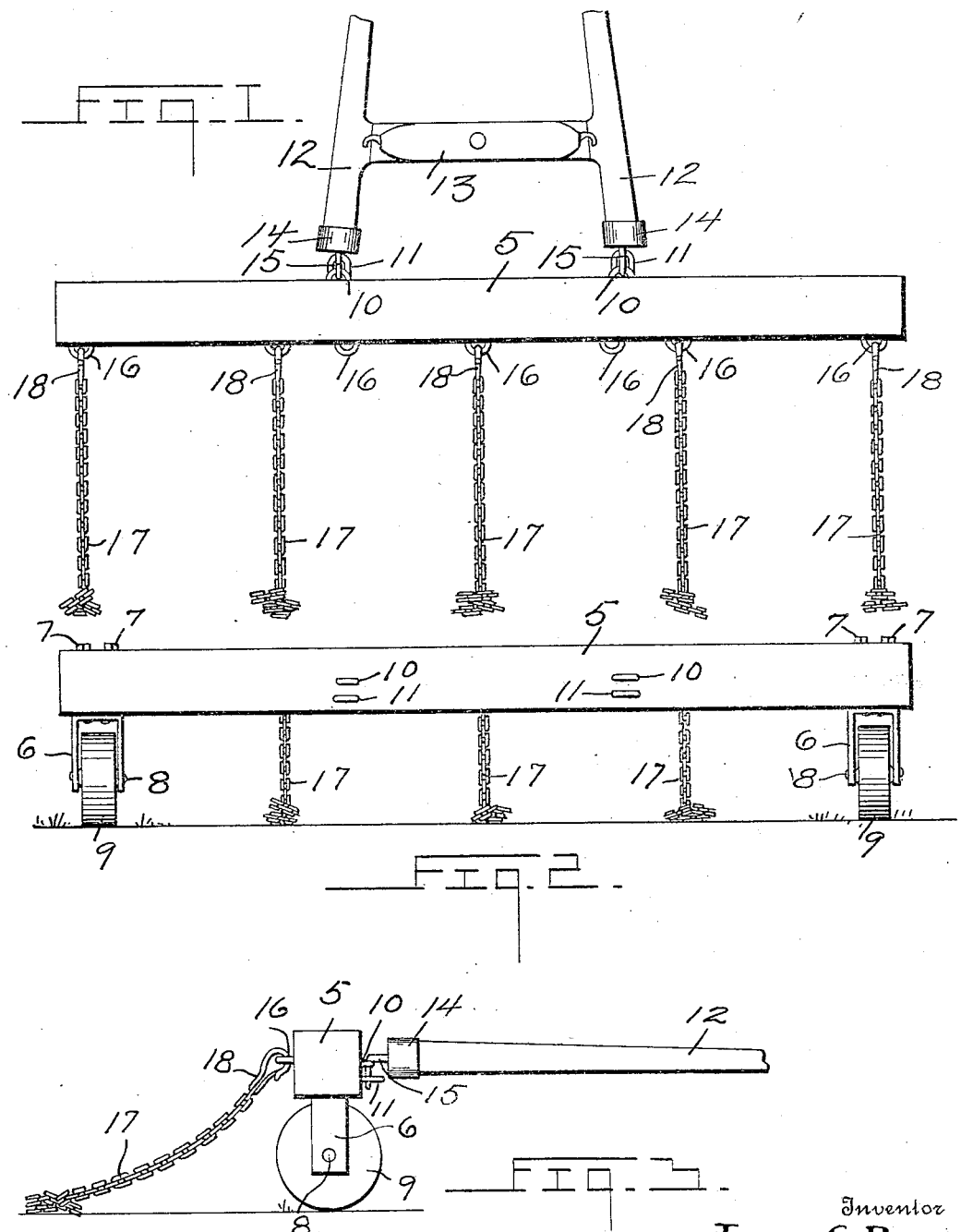

JAMES G. BYRON, OF NEW YORK, N. Y.

LAND-MARKER.

951,387.  Specification of Letters Patent.  Patented Mar. 8, 1910.

Application filed July 10, 1909. Serial No. 506,935.

*To all whom it may concern:*

Be it known that I, JAMES G. BYRON, a citizen of the United States, residing at New York, in the county of New York and State of New York, have invented certain new and useful Improvements in Land-Markers, of which the following is a specification.

This invention has relation to certain new and useful improvements in land markers.

The object of my invention is to provide a handy farm implement, in the form of a land marker, the marking members of which are in the form of a plurality of trailing chain sections, all of which may be united to form a chain of a single length, which can be used wherever a chain is required, for hoisting, loading, or similar purposes.

With these and other objects in view, the present invention consists in the combination and arrangement of parts as will be hereinafter more fully described and particularly pointed out in the appended claims, it being understood that changes in the specific structure shown and described may be made within the scope of the claims without departing from the spirit of the invention.

In the drawings forming a part of this specification and in which like numerals of reference indicate similar parts in the several views, Figure 1 shows a top view of a land marker embodying my invention. Fig. 2 is a front view. Fig. 3 is an end view of my land marker.

A chain is something for which there is a continual demand upon the farm, and in my present invention, I provide a farm implement including a plurality of chain sections which may be detached and connected and used wherever a chain may be required.

In the drawings the numeral 5 designates a beam of suitable length and thickness and preferably square in cross sections, which near each end is provided with a bracket 6, secured by means of the bolts 7, this bracket carrying the pin or journal 8, each pin revolubly supporting a caster wheel 9. To the forward edge of the beam 5, I secure the two upper staples 10, below each of which is positioned a second staple 11, these staples 11, extending outward a greater distance than the upper staples 10, as clearly disclosed in Fig. 3.

This marker is arranged to be drawn through the field by means of one or two draft animals. In the drawings I have shown the marker as arranged to be drawn by one horse, or draft animal to be harnessed between the shafts 12 connected by means of the usual cross bar 13, each shaft at its rear end being strengthened by means of a suitable ferrule. Extending from these reinforced shaft ends, are the hooks 15, these hooks being arranged to snugly fit within the upper staples 10, the hook ends, however, being movably held within the lower larger staples 11. This construction permits the beam 5 to rock and tilt backward and forward in being carried over the field, so that when an obstruction is encountered the shock will not be directly communicated to the shafts, but will be partly compensated by virtue of the pivotal connection.

Secured to the rear of the beam are a plurality of eye bolts 16, seven such eye bolts being shown in Fig. 1.

In connection with the beam 5, I employ a plurality of similar chain sections 17, each chain section at one end carrying a snap hook 18, of a strength at least as great as that of a single link of the chain. In the drawings I have also shown the marker as provided with five such chain sections. Now my marker is especially adapted to be used in marking fields to be planted in potatoes and corn. Where the field is to be marked for potato planting, five chains are employed as shown in Fig. 1. Where the field is, however, to be planted in corn the middle chain is entirely removed and the two intermediately held chains are carried toward and secured to the two eye bolts adjacent to the centrally positioned eye bolts so that four trail marks will be made by the beam. These chain sections are of a suitable length and when used as markers have their ends knotted to form a drag head emphasizing and enlarging the groove made by the trailing chain portion. This construction insures a device which is positive in its operation while being exceedingly easy to be carried over the field.

When not in use, the drag chains can all be readily removed from the eye bolts and united to form a chain of a single length.

An incident of convenience to this arrangement of a device for marking a field, is found in that the chains leave a well defined mark upon the field, while the loose connection between the beam and the shafts insures a device that can be easily operated.

From the foregoing it will be seen that the main structural advantages of my invention reside in the novel arrangement of the wheel supporting beam, the peculiar connection between the beam and shafts, and the pliable marking members.

And having thus described my said invention, what I claim as new and desire to secure by United States Letters Patent is:

1. A land marker having in combination, a beam, a caster wheel secured to each end of said beam, two upper staples held in spaced relation, and secured to the forward face of said beam a lower staple held below each upper staple each projecting outward a greater distance than said upper staple, and a shaft carrying hooks to engage said upper staple and be guided within said lower staples.

2. A land marker having in combination, a beam, a caster wheel secured to each end of said beam, two upper staples held in spaced relation, two lower staples held below each upper staple each projecting outward a greater distance than said upper staples pliable marking members dragging from said bar, and shafts carrying hooks to engage said upper staples and guided within said lower staples.

In testimony whereof I affix my signature, in presence of two witnesses.

JAMES G. BYRON.

Witnesses:
  W. H. McSorley,
  Lawrence H. Saxlund.